United States Patent [19]

McKenzie

[11] 4,010,377

[45] Mar. 1, 1977

[54] COMBINED GENERATOR AND BOAT PROPULSION SYSTEM

[76] Inventor: James W. McKenzie, P.O. Box 504, Rogers, Ark. 72756

[22] Filed: Feb. 20, 1975

[21] Appl. No.: 551,312

[52] U.S. Cl. .................................. 290/1 R; 290/43; 290/46
[51] Int. Cl.² .......................................... H02P 9/04
[58] Field of Search ................ 290/43, 46, 50, 1 A, 290/1 B, 1 C, 1 D, 1 R; 192/103 A, 115; 115/18 E

[56] References Cited

UNITED STATES PATENTS

| | | | |
|---|---|---|---|
| 3,160,252 | 12/1964 | Steinlein | 192/103 A |
| 3,238,911 | 3/1966 | Pazulski | 290/50 |
| 3,545,585 | 12/1970 | Eaton, Jr. | 192/103 A |
| 3,619,632 | 11/1971 | Labombarde | 290/43 |
| 3,812,379 | 5/1974 | Kaufman | 290/50 |

Primary Examiner—Gerald P. Tolin
Attorney, Agent, or Firm—Dennison, Dennison, Meserole & Pollack

[57] ABSTRACT

A power system comprising a generator mounted on the propulsion unit of an outboard motor through an interposed adaptor which exposes the drive connection between the generator and propulsion unit to allow access thereto for employment of the drive mechanism for the driving of accessories other than the outboard motor. Clutch means selectively couple the drive means of the generator and the driven means of the propulsion unit for a selective operation of the mounted generator independently of the propulsion unit.

10 Claims, 4 Drawing Figures

FIG. 1
FIG. 4
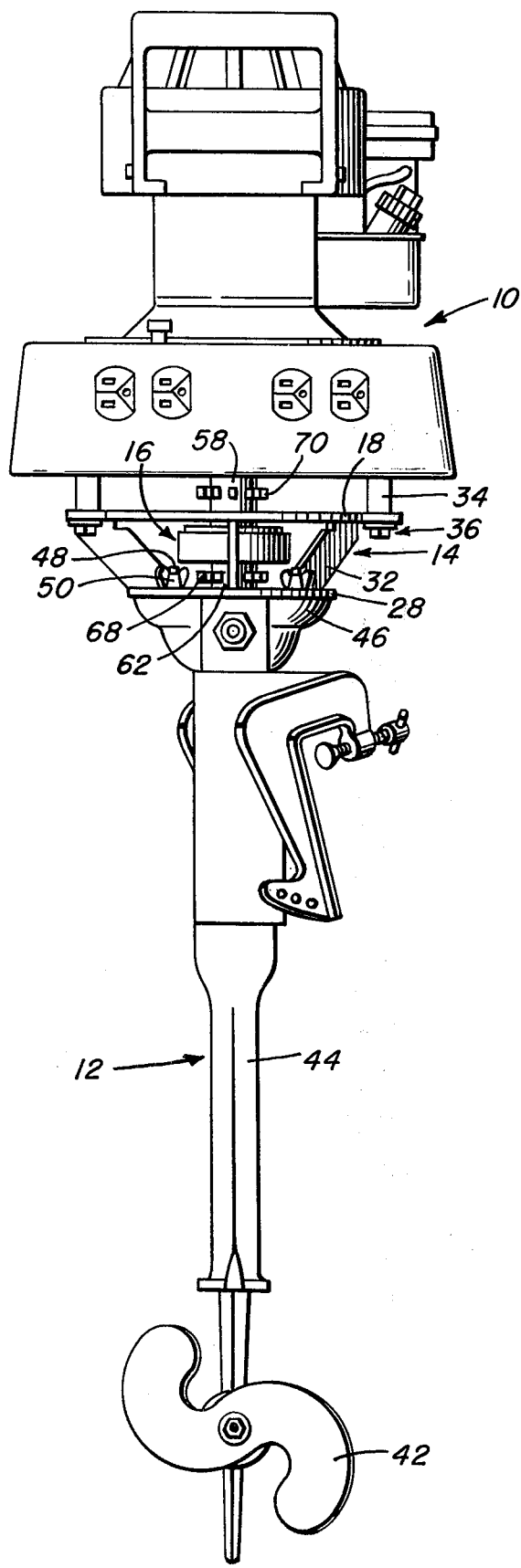
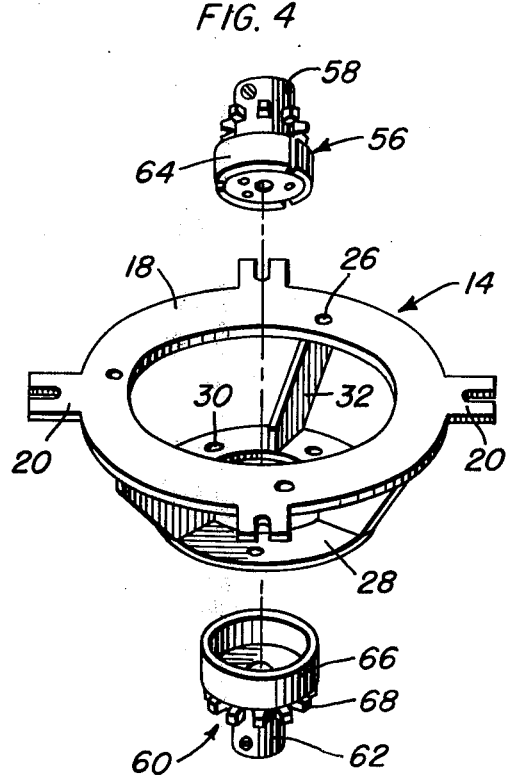

COMBINED GENERATOR AND BOAT PROPULSION SYSTEM

The present invention relates to new and useful improvements in power systems, and is more particularly concerned with a generator combined with the propulsion unit or motor leg of a boat outboard motor through an adaptor unit and clutch means.

It is a primary object of the invention to provide an adaptor which couples the generator to the motor propulsion unit in a manner so as to provide for a clutch controlled driving connection therebetween with the drive means exposed so as to allow access thereto and enable the use of the drive mechanism for driving accessories other than the outboard motor without requiring the demounting of the generator or generating plant.

Another highly significant object of the invention is to utilize an adaptor accommodating clutch assembly between the drive means of the generator and the driven means of the propulsion unit for a selective utilization of the mounted generator to produce electrical energy without a corresponding driving of the outboard motor propulsion unit.

In conjunction with the above object, it is significant that the clutch means be in the nature of a centrifugal clutch or the like for an automatic engagement between the drive and driven means upon the generator drive means achieving a predetermined rotational speed or RPM.

Further objects of the invention include the provision of an adapter which can be utilized as an elevated stand for the generator upon disengagement from the propulsion unit for use of the generator in a location remote from the propulsion unit, and the provision of an adaptor which readily mounts to and between the generator and motor leg in a manner so as to rigidly interconnect and space these components to define in effect an integral unit. The adaptor likewise is readily removable and easily accommodated to conventional generators and outboard motor legs with little or no modification of the components.

Basically, the adaptor, in its preferred form, includes an enlarged upper annular plate with radially projecting slotted lugs accommodating bolts for a mounting of the base of the generator thereto. A similar smaller annular plate is positioned in rigid spaced relation below the upper plate by circumferentially spaced angled braces. The lower plate includes circumferentially spaced apertures therethrough for a bolt mounting of the adaptor to the upper end of the boat motor leg. The downwardly projecting drive shaft of the generator and the upwardly projecting driven shaft of the propulsion unit are axially aligned centrally within the annular plates with the respective shafts mounting the cooperating components of a centrifugal clutch. The shaft and the clutch are exposed for side access thereto between the spaced braces for the use thereof, through appropriately mounted sprockets or the like, as a drive means for auxiliary equipment or accessories. The annular lower plate, upon disengagement from the propulsion unit, provides a flat base for an adaptor supporting of the generator independently of the propulsion unit, the adaptor maintaining the generator elevated for easy access to the drive means thereof. The centrifugal clutch assembly engages at a predetermined RPM whereby, below the predetermined RPM, the generator can be used solely as a means for the generation of electrical energy, and above the predetermined RPM, will effect a direct driving of the propulsion unit.

The above features, objects and advantages will become more readily apparent from the following description of the details of construction and operation. Reference is had to the accompanying drawings forming a part hereof wherein like numerals refer to like parts throughout, and in which:

FIG. 1 is an elevational view of the adaptor and clutch joined generator and propulsion unit;

FIG. 4 is an exploded prospective view of the adaptor and clutch sections.

Figure 2:
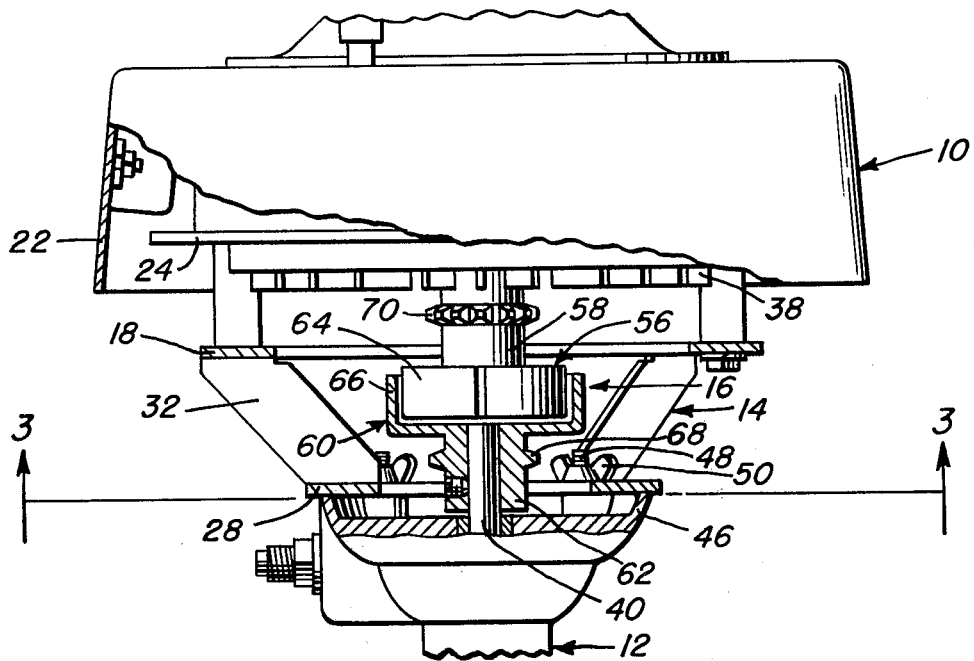
FIG. 2 is an enlarged detail, with portions exposed, of the mounted adaptor and clutch unit.
Figure 3:
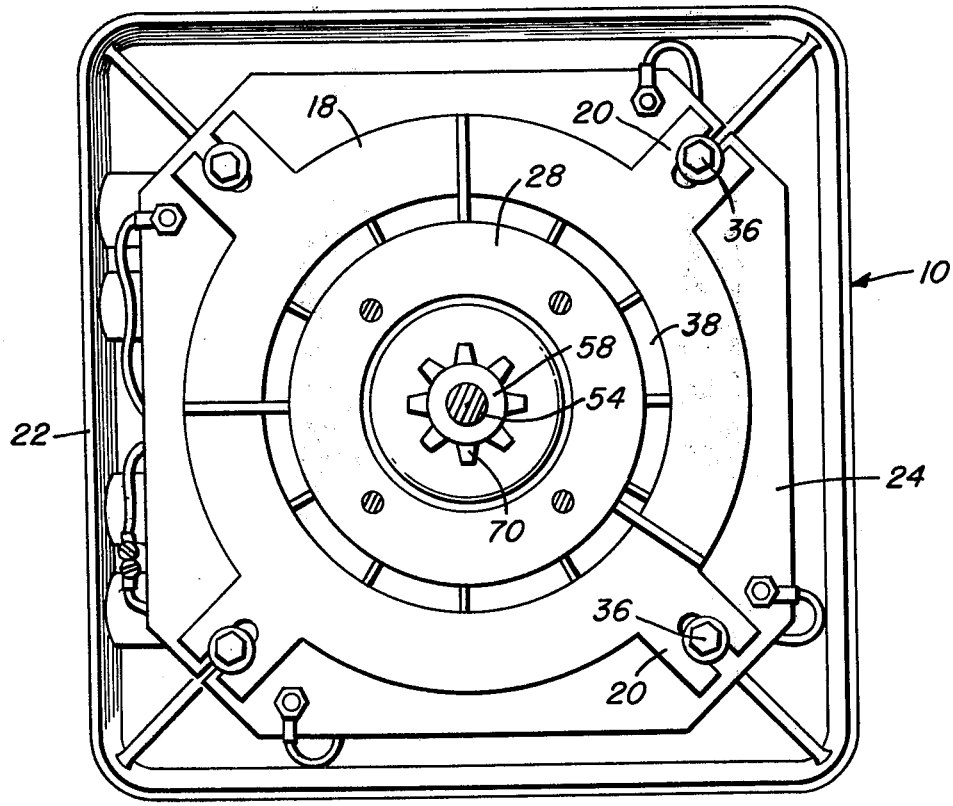
FIG. 3 is a bottom plan view taken substantially on a plane passing along line 3—3 in FIG. 2.

Reference numeral 10 is used to generally designate the generator or generating plant which is basically a gasoline powered air-cooled generator of substantially conventional construction such as the McCulloch Mite-E-Lite Generator which includes a gasoline engine power source. Culbertson, U.S. Pat. No. 2,879,738, herein incorporated by reference, also discloses a gasoline engine powered generating plant. The propulsion unit or boat motor leg, designated by reference numeral 12, is also of substantially conventional construction. The adaptor which structurally joins the generator 10 to the propulsion unit 12 is designated by reference numeral 14 and the power transferring clutch assembly is generally designated by reference numeral 16.

Referring initially to the adaptor 14, it will be appreciated that the structure thereof is to be such so as to rigidly interconnect the generator 10 and propulsion unit 12 in aligned spaced relation and in a manner so as to expose the coupled drive and driven assemblies thereof as shall be explained in more detail subsequently.

The adaptor 14, in its preferred form as illustrated, includes an annular flat upper plate 18 having slotted radially outward projecting lugs 20 at peripherally spaced points thereabout, preferably four such lugs 20 being provided so as to correspond to the four corner portions of the normally rectangular generator housing 22 and the base plate 24 therein. Auxiliary mounting apertures 26 can be provided directly through the top plate 18 at peripherally spaced points if desired.

A second lower flat annular plate 28, of a smaller diameter than upper plate 18, is positioned coaxially therewith in vertically spaced relation thereto. This lower plate is provided with circumferentially spaced mounting apertures 30 therethrough for engagement with the propulsion unit 12. The upper and lower plates are rigidly interconnected by flat plate-like braces 32 at spaced points around the adaptor 14 with the braces 32 having their opposed ends welded respectively to the under surface of top or upper annular plate 18 and the upper surface of the bottom or lower annular plate 28. Preferably three braces 32 will be provided, the spacing thereof affording easy access to the area between the plates 18 and 28.

The base plate 24 of the generator 10 is provided with four depending internally threaded spacer sleeves 34 which align with the upper plate lugs 20 for the reception of upwardly directed mounting bolts 36 engaged through the lug slots and threaded into the spacer sleeves 34. In this manner, the generator 10 is rigidly mounted on the adaptor 14 and spaced slightly upward therefrom so as to provide free clearance for the generator rotor 38. Mounted on the adaptor 14 in this manner, it will be appreciated that the adaptor provides, through the flat lower plate 28, a supporting base for the generator wherein the generator is maintained elevated for appropriate air cooling and the like.

The propulsion unit 12 basically includes a central driven shaft 40 for a power driving of the propeller 42 drive coupled to the lower end thereof, and a shaft enclosing vertical generally tubular housing 44 to which an upper mounting flange 46 is affixed. The flange 46 includes a plurality of upwardly projecting rigid mounting bolts 48 which align with and are received through the holes or apertures 30 in the lower annular plate 28 of the adaptor 14. Appropriate nuts 50 thread on the upper portions of the bolts 50 and lock the plate 28 to the top housing flange 46 so as to provide for a rigid interlocking of the adaptor, and thereby the generator, to the propulsion unit 12.

With reference now specifically to the clutch assembly 16 and mounting means therefor, the drive shaft 54 of the generator 10 is extended below the rotor 38, either by a replacement with a longer shaft or by the addition of an extension thereto. Similarly, the drive shaft 40 is vertically extended above the upper portion of the propulsion unit housing 44 with the shafts 40 and 54 being coaxially aligned and vertically spaced from each other substantially centrally within the adaptor 14. The clutch assembly 16 is in the nature of a conventional centrifugal clutch and includes an upper first section 56 mounted, through an appropriate sleeve-like hub 58, on the depending end portion of the generator drive shaft 54. The second section or portion 60 of the clutch unit 16, also through an appropriate sleeve-like hub 62, is fixed, by set screw means or the like, to the upper end of the propulsion unit driven shaft 40. The upper clutch unit 56 includes the centrifugally controlled shoes 64 which are orientated within the drum portion 66 of the lower section 60 with the operation of the clutching assembly being such so as to engage, and effect a rotational driving of the driven shaft 40 of the propulsion unit 12, upon the attaining of a predetermined rotational speed for the generator drive shaft 54 and mounted clutch section 56. At lesser rotational speeds, the generator will operate independently of the propulsion unit and generate electricity for auxiliary equipment and/or accessories independently of the propulsion unit.

The open framework type construction of the adaptor 14 is particularly significant in that easy access is made available from the side of the assembly to the driving mechanism. In connection therewith, it is contemplated that a sprocket 68 be provided in conjunction with the driven shaft 40. This sprocket 68 can be mounted on the hub 62 of the lower clutch section 60 as a separate element, or it can be integrally formed therewith as illustrated. Providing a drive clutch mounted in this manner, it will be appreciated that auxiliary equipment can be driven, through an appropriate endless chain or the like, simultaneously with the driving of the propulsion unit. Also, it is deemed desirable, a second drive sprocket 70 can be provided in conjunction with the generator drive shaft 54, the sprocket 70 conveniently mounting on or being integrally formed with the hub 58 of the upper clutch section 56. In this manner, sprocket and chain driving of auxiliary equipment can be effected at generator rotational speeds less than that at which engagement of the clutch is effected. As will be noted, access to the upper sprocket 70 is provided through the spacing provided by the elongated mounting sleeves 34.

From the foregoing, it will be appreciated that a highly unique assembly has been defined wherein an adaptor connected generator and propulsion unit provides for electricity generation either in conjunction with or independently of operation of the propulsion unit utilizing a centrifugal clutch assembly for effecting the desired function. Once mounted in assembled relationship, the selected driving of the propulsion unit is effected merely through the attaining of a predetermined rotational speed for the drive shaft of the generator with operation of the generator at lower speeds effecting a desired generation of electricity without an engagement of the clutch means. The open framework and nature of the adaptor allows free access to the clutch assembly and associated drive and driven shafts, each of which may have a drive sprocket associated therewith for the simultaneous driving of external accessories through appropriate endless chain means which will engage about the sprocket and project outwardly therefrom through the open adaptor. If so desired, the adaptor, through the flat base-like nature of the lower plate thereof, can also function as a separate stand or support for the generator remote from the propulsion unit.

The particular structural features of the assembly comprising the invention, including the adaptor and the clutch control drive system, are both structurally and functionally unique over anything that has heretofor been proposed, including the following patents which constitute the most pertinent art of which the inventor is aware: U.S. Pat. No. 2,879,738, Culbertson filed Mar. 31, 1959; U.S. Pat. No. 3,025,823, Tenney filed Mar. 20, 1962; U.S. Pat. No. 3,624,738, Gill, filed Mar. 20, 1970; U.S. Pat. No. 3,812,379, Kaufman et al, filed May 21, 1974.

The foregoing is considered illustrative only of the principles of the invention. As modifications and changes may readily occur to those skilled in the art, it is not desired to limit the invention to the exact construction and operation shown and described. Accordingly, all suitable modifications and equivalence may be resorted to, falling within the scope of the invention as claimed.

What is claimed as new is:

1. A power system comprising a power driven generator, a propulsion unit incorporating a driven shaft, an adaptor mounting said generator on said propulsion unit, said generator including a drive shaft, and clutch means selectively coupling said generator drive shaft and said propulsion unit driven shaft upon attainment, by said generator drive shaft, of a predetermined rotational speed for a direct driving of the propulsion unit by the generator.

2. A system of claim 1 wherein said clutch means comprises a two-section centrifugal clutch, one of said clutch sections being secured to the generator shaft and the second of said clutch sections being secured to the propulsion unit driven shaft.

3. The system of claim 2 wherein said propulsion unit includes auxiliary power takeoff means affixed to said driven shaft.

4. The system of claim 3 wherein said propulsion unit comprises a generally vertically orientated outboard motor leg including said driven shaft, a housing surrounding said driven shaft, propeller means mounted on the lower end of said shaft at the lower end of said housing, the second of said clutch sections engaging the upper end of the driven shaft at the upper end of the housing.

5. The system of claim 4 wherein said adaptor includes an upper plate engaged with the generator outwardly spaced from the generator drive shaft, a lower plate fixed to the propulsion unit housing and rigid spaced braces extending between said plates and orientating the plates, and thus the generator and propulsion unit, in fixed relation to each other exposing the clutch assemblies and auxiliary power takeoff.

6. The system of claim 1 wherein said adaptor includes an upper plate, mounting means engaging said upper plate with the generator outwardly spaced from the generator drive shaft, a lower plate, mounting means fixing the lower plate to the propulsion unit, and rigid spaced braces extending between and orientating said plates, and thus the generator and propulsion unit, in fixed spaced relation to each other, said clutch means being exposed within said adaptor between the upper and lower plates thereof.

7. A power system comprising a power driven generator including a projecting drive shaft, a propulsion unit incorporating a projecting driven shaft, means selectively coupling said shafts for a driving of the driven shaft by the drive shaft, and an adaptor rigidly joining said generator and said propulsion unit in fixed spaced relation to each other, said adaptor having a framework exposing the selectively coupled shafts for access thereto.

8. The system of claim 7 including auxiliary power takeoff means mounted on at least one of said selectively coupled shafts.

9. The system of claim 7 wherein said adaptor includes an annular flat upper plate positionable in surrounding relation to the generator shaft, an annular flat lower plate positioned in surrounding relation to said propulsion unit shaft, and peripherally spaced braces rigidly interconnecting said plates.

10. The system of claim 9 including radially outward projecting mounting lugs at peripherally spaced points about the upper plate of the adaptor.

* * * * *